Oct. 17, 1939.　　　　M. WAGNER　　　　2,176,370
METHOD OF FORMING A CONTAINER
Filed Dec. 10, 1936　　　3 Sheets-Sheet 1
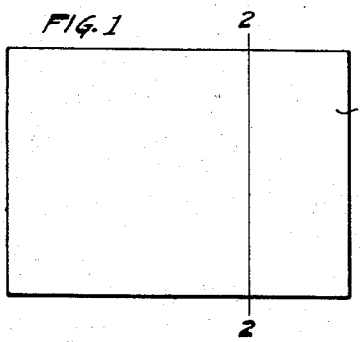
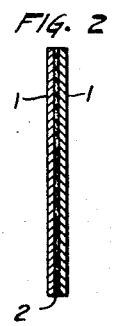
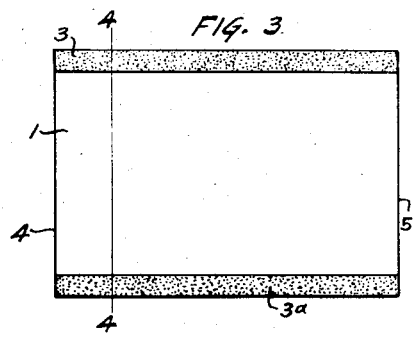
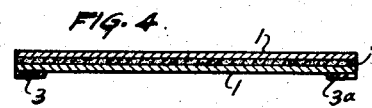
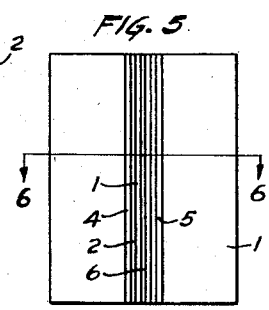
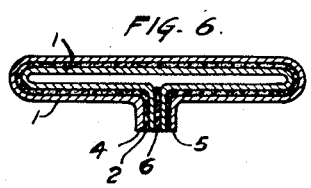
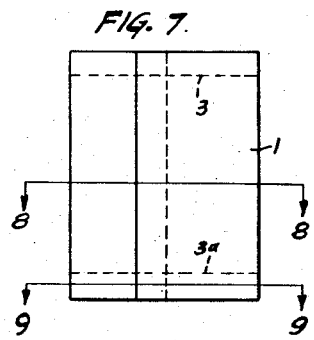
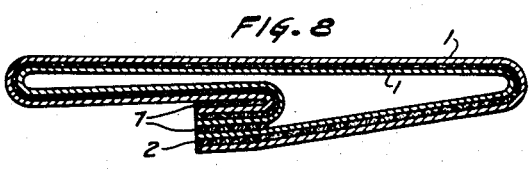
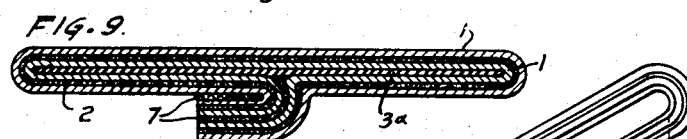
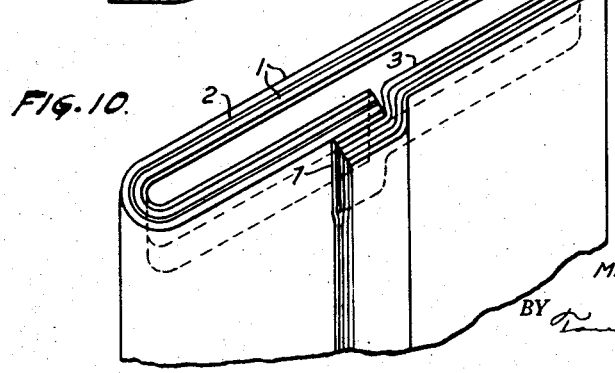
INVENTOR.
MELVIN WAGNER
BY
ATTORNEYS.

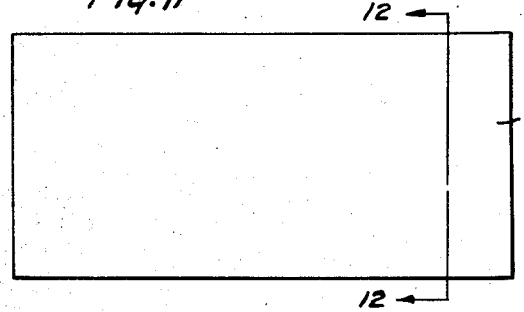
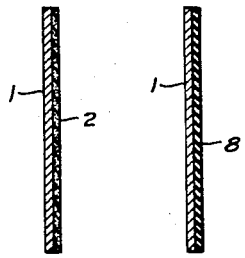
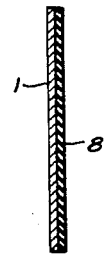
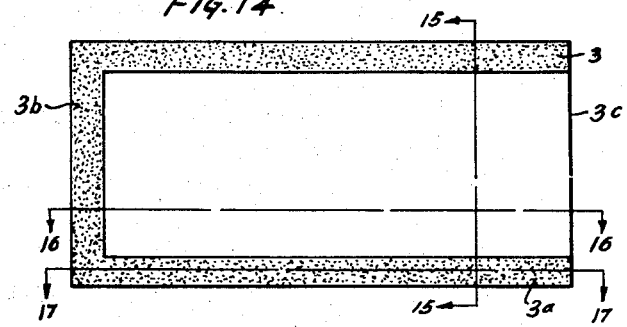
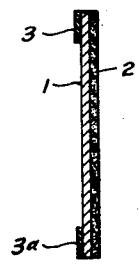
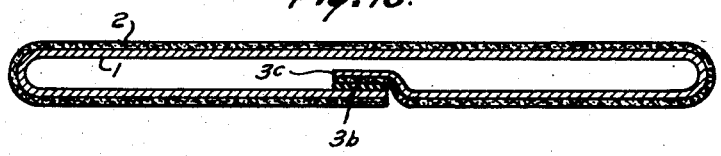

Oct. 17, 1939.  M. WAGNER  2,176,370
METHOD OF FORMING A CONTAINER
Filed Dec. 10, 1936  3 Sheets-Sheet 3
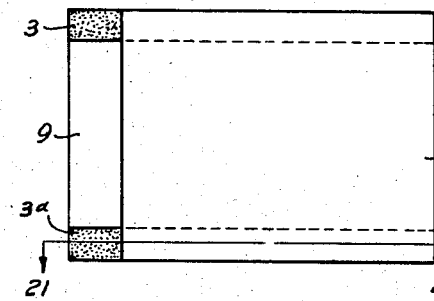
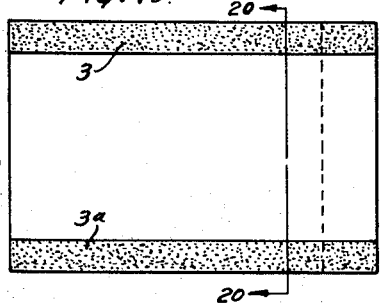
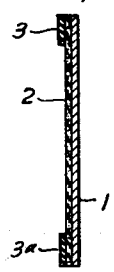
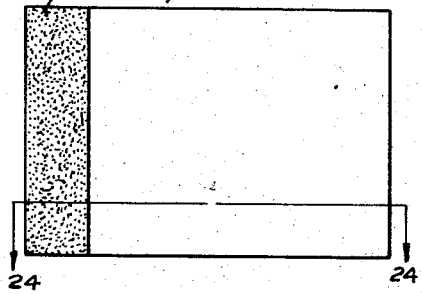
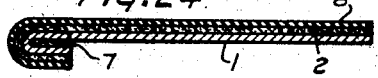
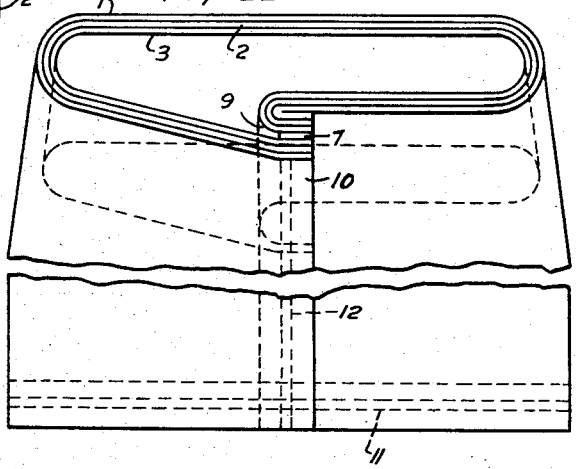
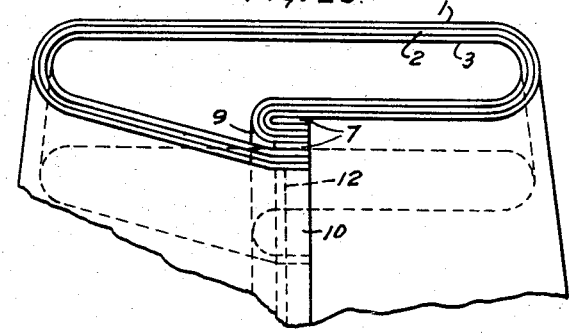
INVENTOR.
MELVIN WAGNER
BY
ATTORNEYS.

Patented Oct. 17, 1939

2,176,370

UNITED STATES PATENT OFFICE

2,176,370

METHOD OF FORMING A CONTAINER

Melvin Wagner, Chicago, Ill., assignor to The Liquid Carbonic Corporation, Chicago, Ill., a corporation of Delaware Application December 10, 1936, Serial No. 115,178

6 Claims. (Cl. 93—35)

My invention relates to a process of manufacturing a composite sheet for use in a gastight and moisture-proof container and also to a process of manufacturing such a container.

It is my object to provide a method comprising the steps of coating a sheet with a varnish-containing solvent; driving off the solvent, while still maintaining the varnish in a plastic, adhesive condition; and then applying to the sheet having this adhesive varnished surface a thermoplastic medium in its non-plastic state so that it will adhere to the adhesive varnished surface. Thereafter the varnish is dried and cooled. When it is desired to assemble the sheet into a container, the application of heat, and sometimes the application of pressure, will cause the thermoplastic medium to adhere to another layer or sheet of thermoplastic medium to form a substantially gas-tight and substantially moisture-proof seal. With some types of thermoplastic media, the adherence may be direct on the paper without the interposition of the varnish.

It is the object of my invention to provide a gas or liquid-tight container of paper which can be sealed to contain gas or liquid.

It is a further object to provide such a container with a flexible body wall so that it will accommodate itself both to the contents which it may contain and any other carton or container in which it may be inserted.

It is my object to provide a material for the making of such containers which is substantially impervious to the passage of liquid and is substantially impervious to the passage of gas within a reasonable period of time; and to provide in combination with such material means of sealing the container formed therefrom without the production of any solvent odors which will contaminate the contents of the container.

In particular it is my object to provide material for a container and a container of the character described consisting of a flexible material such as paper, an impervious coating such as a varnish from which the solvents are driven off after the application of the varnish to the paper, and a thermoplastic sealing medium.

It is my object to provide a container in which the sealing medium is restricted to the sealing areas and which can be applied and will adhere either to the paper directly or to the varnished surface of the paper after the solvent has been driven out of the varnish.

In particular it is my object to provide a sheet of paper having a high surface gloss, that is relatively transparent and dense, such a paper consisting of a sheet that has been coated with silicate of soda or its equivalent and has been passed through hot burnishing rolls, a varnish which firmly anchors itself on the surface of the paper and enters any interstices in the paper to render it substantially impervious, and a thermoplastic sealing medium either along the sealing edges or over the surface of the material which can be caused to adhere by the application of heat.

It is my object to provide a container of the laminated construction described which can be sealed along one edge by the use of the varnish having a solvent, leaving the top and bottom of the container open so that the solvent can be driven off and all odors removed before sealing the bag, and thereafter sealing the bag by the application of heat to the top and bottom thereof adjacent the thermoplastic material in order to complete the closure of the container.

It is my object to provide means of retaining the first mentioned seam in such a position as not to interfere with the sealing of the top and bottom of the bag.

It is my object to provide a blank of container material in which one edge is turned over to form a sealing seam.

Referring to the drawings:

Figure 1 is a plan view of a blank of laminated material.

Figure 2 is a section on the line 2—2 showing a form of laminated material in which two sheets of paper, previously treated with silicate of soda and passed through hot burnishing rolls have been adhered together by a varnish from which the solvent has been driven off.

Figure 3 is the reverse side of the blank of Figure 1 showing the application of the transverse top and bottom thermoplastic sealing strips.

Figure 4 is a section on the line 4—4 of Figure 3.

Figure 5 is a side elevation of a container showing the bringing together of the adjacent edges of the blank and the attachment of these edges one to the other with adhesive, such as a varnish having a solvent.

Figure 6 is a section on the line 6—6 looking in the direction of the arrows.

Figure 7 is a side elevation showing the seam turned over against the side wall of the container to which it is caused to adhere by an adhesive.

Figure 8 is a section on the line 8—8 of Figure 7 looking in the direction of the arrows.

Figure 9 is a section on the line 9—9 of Figure 7 looking in the direction of the arrows. This section is taken through the thermoplastic seal at the bottom of the container.

Figure 10 is a perspective of the top of the container prior to sealing showing a sheet of paper having been treated with silicate of soda and passed through hot burnishing rolls joined by an adhesive film of varnish and having on the interior the top strip of thermoplastic material for sealing.

Figure 11 is a blank shown in plan from the paper side of the blank.

Figure 12 is a section on the line 12—12 which shows a single sheet of paper having a varnished surface.

Figure 13 is a similar view showing a single sheet of paper having a sheet of thermoplastic material over the entire surface.

Figure 14 is a plan view of the inside of the blank showing a horizontal and a vertical thermoplastic sealing strip.

Figure 15 is a section on the line 15—15 of Figure 14 looking in the direction of the arrows.

Figure 16 is a section on the line 16—16 of Figure 14 with the blank folded and sealed along its seam as the first step in forming the container.

Figure 17 is a section on the line 17—17 of Figure 14 when the blank is folded and sealed along its seam with the blank having its vertical seam arranged in the same manner as in Figure 16.

Figure 17a is a view similar to Figure 17 showing in detail a preferred form of seal at the vertical seam.

Figure 18 is an outside elevation of a modified blank consisting of a sheet of paper, a varnished surface, and strips of thermoplastic sealing medium at the top and bottom of the sheet with the edge of the sheet turned over for use in forming the vertical seam when the container is assembled.

Figure 19 is an inside view of the same blank shown in Figure 18.

Figure 20 is a section on the line 20—20 of Figure 19.

Figure 21 is a section on the line 21—21 of Figure 18.

Figure 22 is a perspective of the container as assembled and sealed along the vertical seam and across the bottom prior to being sealed at the top.

Figure 23 is a plan view of the outside of a modified blank which has a sheet of paper, a coating of varnish, and a cover sheet of thermoplastic material, the whole blank being turned over along one vertical edge to form a sealing seam.

Figure 24 is a section on the line 24—24 of Figure 23.

Figure 25 is a perspective of the top portion of the container prior to sealing using the modified blank of Figures 23 and 24 with the vertical seam sealed.

It will be understood that when I refer to paper I refer to a variety of different types of paper, preferably those that are dense and which have a high gloss and are translucent or transparent. A typical specimen of this class is the paper which has been treated by applying silicate of soda thereto and which thereafter has been passed through hot burnishing rolls.

When I refer to a varnish I refer to any impregnating medium which can be applied by spraying, brushing or roller coating or any equivalent means, and, if it contains a solvent, of such character that the solvent can be driven off or will dry off within a reasonable period of time.

Amongst the materials that I have found satisfactory is a varnish of a synthetic resin such as one of the vinyl resins. It will be understood, however, that there are a wide variety of synthetic resins or natural gum resins which can be employed as long as they dry with a hard impervious surface, adhere to the paper, and are dense while retaining their flexibility.

I have found that the combination of the paper and this varnish provides a medium that is substantially impervious to the passage of liquid and gases, even gases under pressure, such as those pressures customarily used in packaging materials with an inert gas. I have found that a single sheet of paper with such a varnish is satisfactory for most purposes, but under some conditions it is desirable to apply two sheets of paper to a single varnish coat between them.

When I refer to a thermoplastic medium I refer to rubber hydrochlorides such as "Pliofilm" or to one of the vinyl resins. Indeed, the vinyl resins when used as a varnish may also be employed as a thermoplastic sealing medium by the application of heat and sometimes of heat and pressure. The rubber hydrochlorides, however, have no solvent odors and are caused to seal and adhere by the application of heat alone, or in some cases, a very slight deformation or pressure.

It will be understood that one of the problems that has confronted the art is to provide a container which will have no residual solvent odors to contaminate the contents of the container, such as food products. By first coating paper which has been treated by applying silicate of soda thereto and which thereafter has been passed through hot burnishing rolls, which are comparatively impervious to solvents, with a solvent-containing varnish or coating and then driving off the solvents by evaporation, the resulting sheet is impervious and is thermoplastic over the entire surface and on given areas as desired. The sealing can take place to form the container and to close it after the solvents have been thus removed so that there is no danger of the contamination of the contents of the container. I am careful to evaporate this solvent before having the two materials adhere so that there will be no entrapped solvent. The flexibility of the coating of the paper can be regulated by the addition of the usual plasticizers.

Turning to the drawings in detail and in particular to Figures 1 to 10, which constitute the first embodiment of my invention, I designates the paper sheets between which is the adhesive varnish 2. These sheets are applied one to the other when the varnish is still in a plastic adhesive condition and thereafter the solvent is evaporated, leaving the sheets adhering in firm but flexible engagement. 3 and 3a designate the thermoplastic strips which are caused to adhere to the paper sheets. These strips are located preferably at the top and bottom of the blank.

The blank is then folded so as to bring the vertical edges 4 and 5 into abutting engagement. They are caused to adhere to one another by a vertical strip of adhesive varnish 6 or a thermoplastic medium. If the varnish is used with a solvent, the solvent can be evaporated away because the top and bottom of the container are still open and air can circulate from end to end through the container. It is desirable to fold the vertical seam back against the side wall of the container and to cause it to adhere to the side wall by the adhesive 7 or a strip of thermoplastic material. After the bag is thus formed, the bottom is sealed by the application of heat along the thermoplastic bottom strip 3a. The package is then filled, charged with gas if it is to be gas-charged, and then the top is sealed by heat along the thermoplastic strip 3.

Turning to the modification shown in Figures 11 to 17 inclusive, a single sheet of paper 1 is coated with either the varnish or the thermoplastic material 2 or 8 respectively. I prefer to use the varnish and to mount on the opposite side the horizontal strips of thermoplastic material 3 and 3a, with a vertical side strip at the seam designated 3b. The advantage of this arrangement is that the adjacent vertical seam edges can be caused to adhere by bringing the strip 3b against the outside of the adjacent seam edge at 3c. This provides a seam that is flat with the overlapping portion on the inside of the container. Thereafter the container is sealed at the top and bottom as heretofore described.

Referring to the modification shown in Figures 18 to 22 inclusive, the sheet of paper 1 is coated with the varnish 2 and then there is mounted upon the varnished surface at the top and bottom the horizontal strips 3 and 3a of thermoplastic sealing material. The edge of this blank at 9 is turned over. When the bag is folded to form a container, the edge 9 is in position to be overlapped by the opposite seam edge 10 so that the thermoplastic strips 3 and 3a will by themselves or in cooperation with a varnish cause the vertical seam to adhere. If desired, a vertical strip of thermoplastic material can extend vertically on the face 9 throughout its length.

In Figures 23 to 25 inclusive, such a construction as shown in Figures 18 to 21 is employed except that the sheet of thermoplastic material completely covers the varnished surface. The area where the heat has been particularly applied for sealing purposes is indicated by the dotted lines at 11 and 12.

Thus it will be seen that my invention consists primarily of a sheet of paper, an impregnating varnish to render the paper impervious, and a thermoplastic sealing method arranged either in a sheet or in strips which is not subject to solvent odors. It is therefore possible to secure the plasticity and ready application of a varnish, to drive off the solvent odors, and then to seal the container immediately before and after filling without danger of contamination of the contents of the container.

It will be understood that my method of forming a container and the material for so forming a container consists of coating a sheet with a varnish-containing solvent, driving off the solvent while still maintaining the varnish in a plastic, adhesive condition, and of applying the thermoplastic medium in its non-plastic state on the adhesive varnished surface. The solvent may be evaporated either by heating, by a blast of air or by suction. The thermoplastic medium may be pressed against the adhesive varnish. In any event, after the union has been effected, the composite sheet is cooled. The same procedure is followed in causing the thermoplastic material to adhere to a paper surface or in causing two sheets of paper to adhere to one another.

The sheet of paper I prefer is a paper sheet that is coated with silicate of soda or its equivalent and passed through hot, burnishing rolls. Despite this fact it is not impervious to moisture or to gases, but the application of the varnish coating makes it possible to fill any of the pin holes or interstices in the sheet in order to render the sheet substantially impervious to moisture or gases. Likewise the impregnation of the sheet so described serves to anchor firmly the varnish coating into and upon the sheet.

This application covers the method of forming this composite sheet of container material, while my copending application Ser. No. 114,651, filed December 7, 1936, covers the product.

It will be understood that I desire to comprehend within my invention such modifications as may be necessary to adapt it to varying conditions and uses.

Having thus fully described my invention, what I claim as new and desire to secure by Letters Patent, is:

1. A method of forming a container, substantially impervious to gases and liquids, consisting of the steps (a) coating a sheet of paper with a solvent-containing impervious varnish; (b) applying thereon a preformed thermoplastic medium in its cold state; (c) folding the sheet into container form with the thermoplastic medium adjacent the edges of the sheet in engagement with one another; and (d) applying heat and pressure to said sheet to cause the thermoplastic media to adhere to one another to seal the container.

2. A method of forming a container comprising the steps of (a) coating a paper sheet with a solvent-containing resin varnish; (b) evaporating the solvent from the varnish; (c) applying a sheet of resilient thermoplastic material to the sheet so formed against the side coated with the varnish; (d) forming the sheet into the form of a container with the thermoplastic-bearing edges adjacent to one another; and (e) applying heat and pressure to said edges to cause the thermoplastic media to adhere to seal the container.

3. In a method of forming a container, the steps of (a) coating a silicate coated paper with a solvent-containing impregnated varnish to render the sheet substantially impervious to the passage of gases and liquids; (b) forming the sheet into a container by turning it so that its adjacent vertical edges are engaged along a seam; (c) pressing the edges along the seam in contact so as to cause them to adhere while the varnish is still plastic with the solvent; (d) evaporating the solvent from the varnish while the ends of the container are still open; and (e) sealing the top and bottom of the container after the solvents have been driven off by applying heat to a thermoplastic medium devoid of solvents inserted within the seam areas of the container in order that said container may be sealed in the absence of solvent odors.

4. In a method of forming a sheet to make a container, the steps of (a) coating a sheet with a varnish-containing solvent; (b) driving off the solvent partially while still maintaining the varnish in a plastic, adhesive condition; (c) applying a thermoplastic medium in its non-plastic state on the plastic adhesive varnished surface; (d) completing the removal of all solvent odors by evaporation; and (e) pressing the thermoplastic medium and the varnish against one another.

5. In a method of forming a sheet to make a container, the steps of (a) coating a paper sheet with a solvent-containing varnish; (b) evaporating the solvent partially from the varnish, leaving the varnish in a plastic, adhesive state by heating the varnished sheet; (c) applying a thermoplastic medium to the varnished surface while the thermoplastic medium is unheated and is devoid of solvent odors; (d) pressing the varnish and thermoplastic medium against one another; and (e) cooling the composite sheet so formed.

6. In a method of forming a composite sheet for use in a container, the steps of (a) treating a sheet with silicate of soda; (b) coating the sheet with a solvent-containing resinous varnish coating; (c) evaporating the solvent while leaving the varnished surface adhesive; (d) applying to the adhesive surface a thermoplastic medium in its non-plastic state and causing it to adhere by pressure; and (e) completing the drying of the varnish.

MELVIN WAGNER.